(12) United States Patent
Raman

(10) Patent No.: US 6,970,499 B2
(45) Date of Patent: Nov. 29, 2005

(54) VARYING EARLY-LATE SPACING IN A DELAY LOCKED LOOP

(75) Inventor: Sundar Raman, Fremont, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 652 days.

(21) Appl. No.: 09/871,276

(22) Filed: May 30, 2001

(65) Prior Publication Data

US 2002/0181560 A1 Dec. 5, 2002

(51) Int. Cl.[7] ............................................. H04B 1/707
(52) U.S. Cl. ...................................................... 375/150
(58) Field of Search ................................ 375/142, 144, 375/148, 150

(56) References Cited

U.S. PATENT DOCUMENTS

| | | | |
|---|---|---|---|
| 5,912,919 A | | 6/1999 | Lomp et al. |
| 5,953,367 A | * | 9/1999 | Zhodzicshsky et al. ..... 375/147 |
| 6,636,558 B1 | * | 10/2003 | Schnaufer et al. .......... 375/150 |

FOREIGN PATENT DOCUMENTS

| | | | |
|---|---|---|---|
| EP | 0849887 A | | 6/1998 |
| EP | 0984577 A | | 3/2000 |
| GB | 2349555 A | | 11/2000 |
| WO | 0039940 | | 7/2000 |

OTHER PUBLICATIONS

Aue V et al, "A Non–Coherent Tracking Scheme for the Rake Receiver That Can Cope With Unresolvable Multi-path" ICC '99. 1999 IEEE International Conference on Communications. Conference Record. Vancouver, CA, Jun. 6–10, 1999, IEEE International Conference on Communications New York, NY: IEEE, US, vol. 3, Jun. 6, 1999, pp. 1917–1921, XP000903700 ISBN: 0–7803–5285–8 figure 2 p. 1917, paragraph I.

* cited by examiner

*Primary Examiner*—Stephen Chin
*Assistant Examiner*—Kevin Kim

(57) ABSTRACT

A rake receiver tracks a component of a multipath information signal transmitted over a communication network. The rake receiver aligns and synchronized the component with a locally generated replica of the code sequence that was originally used to spread the information signal at the transmitter side. The rake receiver derives an early de-spread signal using an early shifted version of the replica of the code sequence. The replica is early shifted by a variable delay. The rake receiver also derives a late shifted de-spread signal using a late shifted version of the replica of the code sequence. The replica is late shifted by the same variable delay. The variable delay may be chosen arbitrarily or among a selection of predetermined values. The predetermined values may be selected so that the tracking process is optimized.

3 Claims, 3 Drawing Sheets

VARYING EARLY-LATE SPACING IN A DELAY LOCKED LOOP

FIELD OF THE INVENTION

The invention relates to a method for tracking a resolved component of a multipath signal.

The invention also relates to an arrangement and a rake receiver for tracking a resolved component of a multipath signal.

The invention further relates to an apparatus comprising such a rake receiver. The apparatus may be a mobile phone.

The invention finally relates to a software application for carrying out a method of the invention.

The invention may be relevant to the processing of communication signals over a cellular network using the Code-Division Multiple Access technology for tracking code delays of multipath signals from a base station to a mobile station. The invention may also be applied in a rake receiver in a mobile communication device for resolving and tracking arriving delays of multipath components of a transmitted signal.

BACKGROUND ART

Various multiple-access technologies may be used for cellular communications. A first group of these technologies consists of narrowband channelized technologies such as the Frequency-Division Multiple Access (FDMA) technology and the Time-Division Multiple Access (TDMA) technology. In a FDMA communication system each user is assigned for the duration of a call to a first specific frequency sub-band, or channel, of the bandwidth reserved for up-link communications (from a mobile station to a base station) and to a second frequency sub-band, or channel, of the bandwidth reserved for down-link communications (from a base station to a mobile station). In a TDMA system each user is assigned to a different time slot and is entitled to access the entire reserved sub-bands.

A second group of multiple-access communication technologies consists of wideband channelized technologies. Among these, the Code-Division Multiple Access (CDMA) technology has been widely adopted as a standard. CDMA allows each user to use the entire bandwidth for the complete duration of a call.

CDMA is a spread spectrum technology which means that the information contained in the information signal is spread over a much greater bandwidth than that of the original signal. In the Direct Sequence Spread Spectrum (DS-SS) technology, the information signal of data rate Tb is multiplied in the transmitter by a pseudo-random binary sequence, the code sequence, of clock period T, the so-called chip period, where Tb>>T. This has the effect of increasing the bandwidth of the signal by the ratio Tb/T. The spread signal is then transmitted over the wider band with a reduced power spectral density relative to a corresponding de-spread signal. The code sequence is independent of the information signal and is known to the transmitter and the receiver.

At the receiver, the received wideband spread spectrum signal must be de-spread in order for the information signal to be recovered. De-spreading is achieved by correlating the spread signal with an exact replica of the code sequence used in the transmitter. The replica must be synchronized with the received spread signal. The replica of the code sequence is locally generated at the receiver and must be aligned and synchronized within one chip of the received spread signal.

Code synchronization may be performed in two stages: a code acquisition followed by a fine code tracking. Acquisition reduces the alignment timing offset between the received spread signal and the locally generated code sequence to less than a chip period. Tracking aligns and maintains the two signals synchronized to a finer precision.

In a real communication environment such as urban and suburban areas, radio signals are reflected and scattered off various objects along the transmission path between the transmitter and the receiver. Therefore the spread signal, mentioned above, encounters multipath when transmitted from the base station to the mobile station. In addition, phase cancellation of signals following different paths may cause severe fading and may lower the received signal power. However CDMA provides robust operation in such fading environments. Indeed CDMA takes advantage of multipath fading to enhance communication and voice quality. For this purpose, a rake receiver is present in each mobile station and allows selecting the strongest multipath signals incoming from the base station. Transmission delays are estimated for the strongest multipath signals and the estimated delays are assigned to specific "fingers" of the rake receiver. A finger is a processing element that correlates the received spread signal with the replica of the locally generated code sequence on the basis of the estimated time delay assigned to the finger. The fingers' outputs are then weighted and then coherently combined to produce an enhanced signal. Thus, the multi-path nature of the channel is used to create a diversity advantage in CDMA.

SUMMARY OF THE INVENTION

It is an object of the invention to provide a tracking method that provides fast and robust code sequence synchronization.

To this end, a method of the invention comprises:

de-spreading the resolved component using a locally generated code sequence being advanced by a first variable delay, to obtain an early de-spread signal;

de-spreading the resolved component using the locally generated code sequence being retarded by a second variable delay, to obtain a late de-spread signal; and, deriving a correction signal from the early de-spread signal and the late de-spread signal to control the tracking.

In the invention, the early and late de-spread signals are derived to allow tracking and aligning the resolved component with the locally generated code sequence. Running comparison algorithms with the obtained early and late de-spread signals is a well known process that allows determining whether the resolved component and the generated code sequence are on-time, and if not, such a process provides a correction term to synchronize the two signals. The early de-spread signal is obtained by correlating the resolved component with the code sequence that is previously advanced. The code sequence is early shifted by a first variable delay. The associated late de-spread signal is obtained by correlating the resolved component with the code sequence that is previously delayed. For deriving this late de-spread signal, the code sequence is late shifted by a second variable delay. The inventor has realized that varying the first and the second delays permits to improve the tracking of resolved components. An advantage of the invention is improved performances for the tracking of the resolved component and the synchronization with the code sequence.

In an embodiment of the invention, the first and the second delays are substantially equal.

In another embodiment of the invention, the variable delays are randomly selected from a plurality of predefined values. In such an embodiment, a plurality of predefined values for the first and second variable delays may be determined so that these predetermined values provide efficient tracking results for various quality levels of the received multipath signal. These predetermined values are then used for synchronizing the code sequence and the resolved component.

In another embodiment of the invention, the first and the second variable delays are representative of the signal quality of the received multipath signal. In such an embodiment, a quality indicator is determined for the received information multipath signal, for instance a signal strength indicator, and the values of the variable delays used to determine the early and late de-spread signal, respectively, are adaptively adjusted to provide optimum performance under varying signal quality levels.

Further a rake receiver of the invention comprises:

early shifting means for deriving an early code sequence by advancing a locally generated code sequence by a first variable delay;

first correlating means for de-spreading the resolved component using the early code sequence resulting in an early de-spread signal;

late shifting means for deriving a late code sequence by retarding the locally generated code sequence by a second variable delay;

second correlating means for de-spreading the resolved component using the late code sequence resulting in a late de-spread signal; and, adjustment means for deriving a correction signal from the early and late de-spread signals to control the tracking.

BRIEF DESCRIPTION OF THE INVENTION

The invention is explained in further details by way of examples and with reference to the accompanying drawings wherein.

Figure 1:
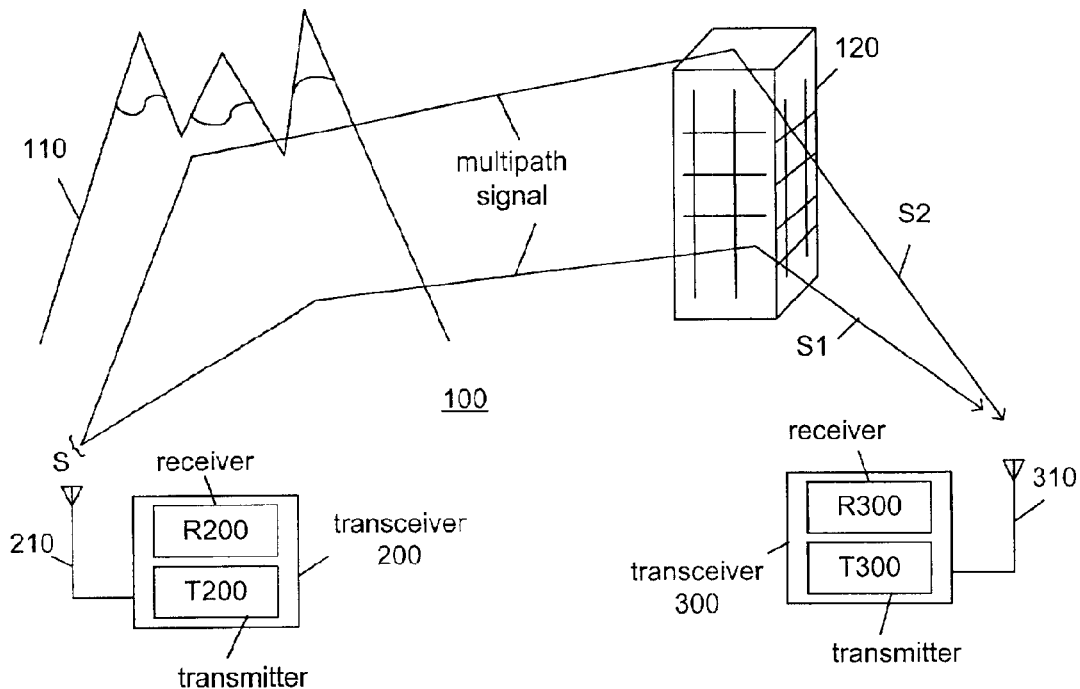
FIG. 1 is a communication system.

Elements within the drawing having similar or corresponding features are identified by like reference numerals.
Preferred Embodiment FIG. 1 is a communication system 100 of the invention comprising a first transceiver 200 communicating with at least a second transceiver 300. The transceiver 200 may be a base station and the transceiver 300 may be a mobile station such as a handset or a cell phone in a CDMA cellular communication system. The transceivers 200 and 300 comprise respective transmitters T200 and T300 for transmitting information signals and comprise respective receivers R200 and R300 for receiving information signals. The transmitter T200 transmits via an antenna 210 an information signal S spread by correlation with a pseudo random noise code sequence. The signal S was also previously modulated by correlation with a carrier signal of carrier frequency fc. The spread signal S is received by an antenna 310 of the transceiver 300.

While transmitted from the transmitter T200 to the receiver R300, the signal S is subjected to multipath propagation. In this embodiment, the signal S is reflected and scattered off the mountains 110 and the building 120. The spread signal S is the superposition of at least two multipath signals S1 and S2. The multipath signals S1 and S2 have different propagation paths and different propagation delays. The path attenuation and phase shift to which the signals S1 and S2 are subjected are assumed to be random-like and mutually independent. As a result the signal S can be thought as the superposition of a number of randomly attenuated and phase rotated signals containing among others the signals S1 and S2.

Figure 2:
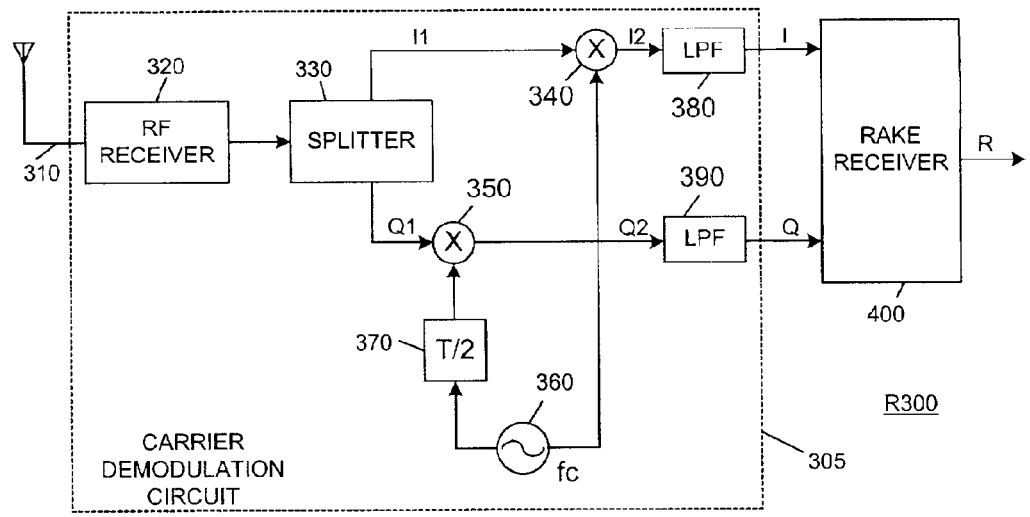
FIG. 2 is a block diagram of a receiver.

FIG. 2 is a block diagram of the receiver R300. The signal S transmitted from the base station 200 is received by the antenna 310 and inputted to a carrier demodulation circuit 305 of the receiver R300. The signal S is passed through a RF receiver 320 and thereafter processed by a splitter 330 for splitting into two radio signals I1 and Q1. The radio signal I1 is de-spread in a correlator 340 with the oscillator output fc of an oscillator 360 resulting in an in-phase demodulated base-band signal I2. The radio signal Q1 is de-spread in a correlator 350 with the oscillator output fc shifted to $\pi/2$ in a phase shifter 370 resulting in a quadrature demodulated base-band signal Q2. The base-band signal I2 and Q2 are then respectively passed through low pass filters 380 and 390 for providing channel selectivity. Both filtered signals I and Q are then provided to a rake receiver 400 for multipath components resolving and diversity combining into a signal R.

Figure 3:
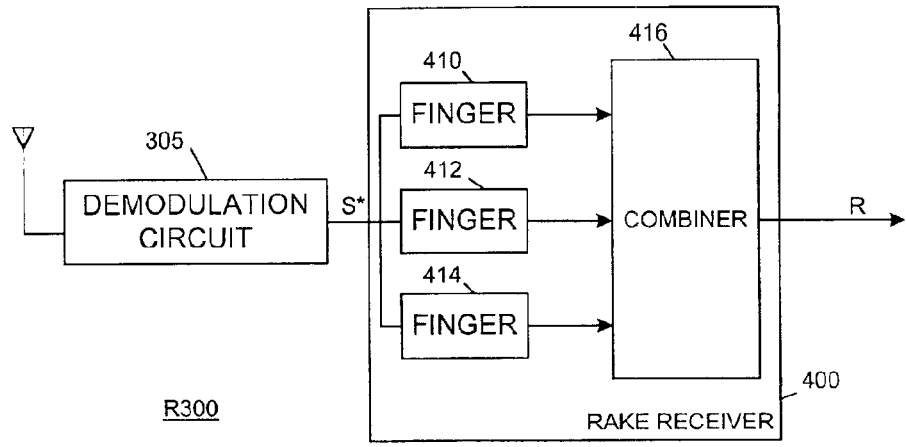
FIG. 3 is a block diagram of a receiver.

FIG. 3 is another block diagram of the receiver R300. The receiver R300 comprises the carrier demodulation circuit 305 for extracting the in-phase and quadrature components I and Q further transmitted as a complex signal S* to the rake receiver 400. The rake receiver 400 comprises three rake fingers 410, 412 and 414. Each finger 410–414 is assigned a multipath component S1, S2 and S3, respectively, of the received signal S for acquisition and tracking. The rake fingers 410–414 may be assigned to the strongest multipath components only. The rake receiver 400 also comprises maximal ratio combining means 416 for combining the multipath components S1–S3 resolved by the fingers 410–414 to provide diversity. The resulting signal is the signal R.

Figure 4:
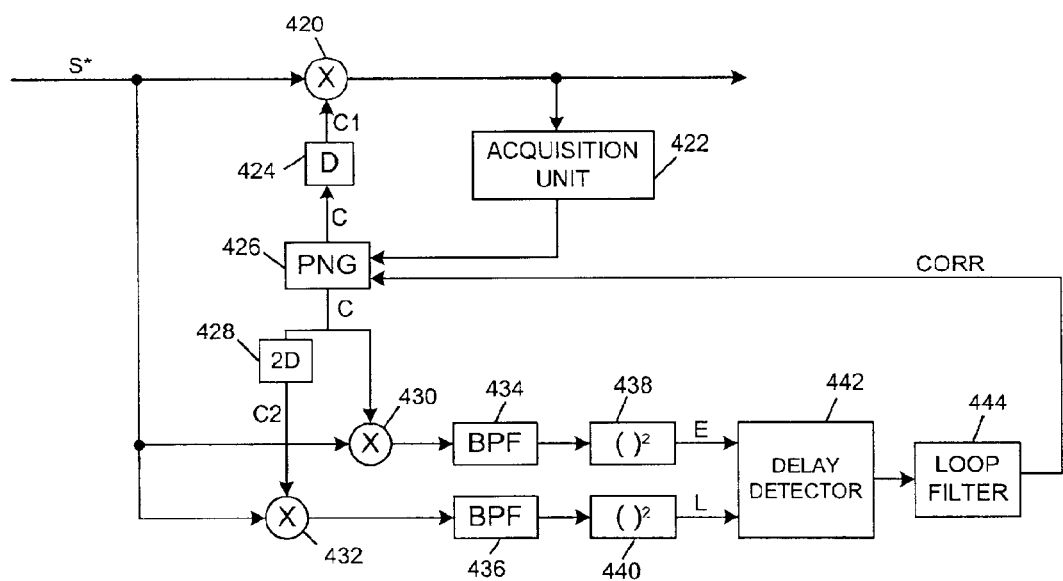
FIG. 4 is a block diagram of a rake finger of a receiver of the invention.

FIG. 4 is a circuit block diagram representing an embodiment of a rake finger 410–414 of the invention. Initially the rake finger 410–414 adopts an acquisition mode. Acquisition is performed in the acquisition unit 422 for synchronizing a replica C1 of the code sequence with the multi-path component S1–S3 assigned to the finger 410–414. The code sequence C1 is obtained from a replica C of the code sequence originally used to spread the information signal S at the transmitter side. The code sequence C is generated in a pseudo-random noise generator 426. The code sequence C1 is obtained by delaying by a variable delay D the code sequence C received from the generator 426 in a time shifter 424. In the invention, the delay D is variable. The component S1–S3 is de-spread by correlation of the signal S* with the code sequence C1 in a correlator 420. The acquisition process provides synchronization on the multipath component S1–S3 to within half a chip accuracy.

Thereafter, in a tracking mode, the rake finger 410–414 maintains the code sequence C1 aligned to the assigned multi-path component S1–S3 on the basis of an correction signal CORR. The baseband signals I and Q are provided in the form of a complex input signal S* to the rake finger 410–414. The signal S* is then branched in two branches for determining the early and late de-spread signals E and L, respectively.

The early de-spread signal E is obtained by first de-spreading in a correlator 430 the received spread signal S* using the code sequence C. As mentioned earlier, the code sequence C transmitted to the correlator 430 is advanced by the delay D with respect to the code sequence C1 actually used for de-spreading the component S1–S3 in the correlator 420. As a result, the signal E is referred to as the "early" de-spread signal. The early de-spread signal E is then determined by processing the output signal of the correlator 430 in a low-pass filter 434 and by complex magnitude squaring in a squared arrangement 438. The early de-spread signal E obtained represents a value of the energy of the resolved component S1–S3 before a presumed occurrence of a peak of energy of the component S1–S3.

Symmetrically, the late de-spread signal L is obtained by first de-spreading in a correlator 432 the received spread signal S* using a version C2 of the code sequence C. The code sequence C2 is delayed in a time-shifter 428 by a variable delay substantially equal to 2D before being fed to the correlator 432. Thus, the code sequence C2 transmitted to the correlator 432 is delayed by the delay D with respect to the code sequence C1 transmitted to the correlator 420. The time spacing between the early and late de-spread signals E and L is therefore substantially equal to 2D. The late de-spread signal L is then derived by processing the resulting output of the correlator 432 in the low-pass filter 436 and by complex magnitude squaring in a squaring arrangement 440. The late de-spread signal L is representative of the energy of the de-spread resolved component S1–S3 taken after a presumed occurrence of a peak of the energy of the component S1–S3.

The early and late de-spread signals E and L are then inputted to a delay detector 442. The delay detector 442 is for example a digital processing unit. The delay detector 442 processes the two signals E and L and determines the early-late status of the tracking of the assigned multipath component S1–S3. The result is then provided to a loop filter 444 where the appropriate correction signal CORR is derived and transmitted to the pseudo-noise generator 426 generating the code sequence C. The correction signal CORR allows monitoring the phase of the code sequence C so that the code sequence C, or more precisely the code sequence C1, is kept synchronized with the assigned component S1–S3.

As mentioned above, the de-spread component S1–S3 is then obtained at the output of the correlator 420 from the correlation of the signal S* with the adaptively aligned code sequence C1. It is also within the scope of the invention to contemplate an embodiment where different delays are used to derive the early and late de-spread signals E and L. Thus in this embodiment, the code sequence fed to the correlator 430 is time-shifted (advanced) by a first delay with respect to the version of the code sequence fed to the correlator 420 for actual de-spreading of the component S1–S3 and the code sequence fed to the correlator 432 is time-shifted (delayed) by a second delay, different from the first delay, with respect to the version of the code sequence fed to the correlator 420 for actual de-spreading of the component S1–S3.

Figure 5:
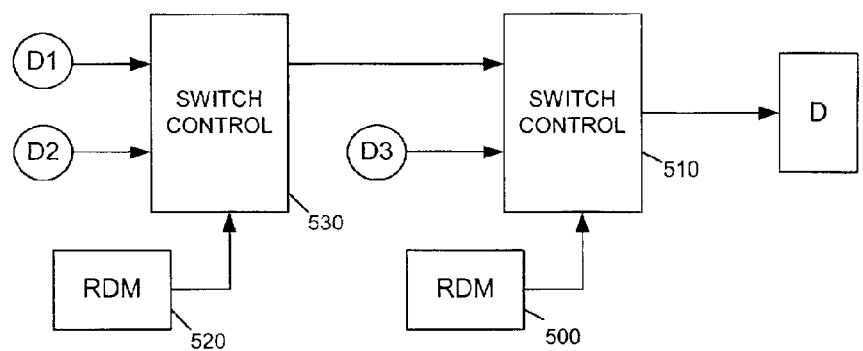
FIG. 5 is a delay generator of the invention.

FIG. 5 is an embodiment of means for generating the variable delay D. In this embodiment, the delay D may take three values D1, D2 and D3. The values D1–D3 may be experimentally chosen to optimize the tracking of the resolved component S1–S3 for various quality levels of the received multipath signal S. A given value may be chosen more often than other predetermined values to further optimize the tracking process. For example, the value D3 is taken every other calculation of the early and late de-spread signals E and L, and the values D1 and D2 are taken alternately otherwise. To this end, the generating means comprises a first random generator 500 and a first switch control 510. The switch control 510 transmits the selected value of the delay D to the delay shifters 424 and 428. The random generator 500 allows random selection between the value D3 on one hand, and the values D1 and D2 on the other hand. The generating means also comprises a second random generator 520 and a second switch control 530. The random generator 520 allows random selection between the values D1 and D2, which selected value D1 or D2 is transmitted by the switch control 530 to the switch control 510. Thus, different values for the delay D may be used alternately to track the resolved component and synchronize the code sequence C with the resolved component. In another embodiment, the values D1–D3 are not randomly selected but on the basis of a measurement or calculation of a quality indicator for the received multipath signal S. This quality indicator may be derived on real-time by the receiver R300 or the transceiver 300 when receiving the information signal S. The value of the quality indicator is then transmitted to the rake receiver 400 that retrieves from a look-up table a value of the delay D associated with the provided value of the quality indicator. The look-up table may be built through experiments and simulations of the rake receiver for different values of the quality indicators and delays D. Thus, the tracking of the components S1–S3 is optimized. In another embodiment, the quality indicator is a signal to noise ratio calculated for the multipath signal S.

Figure 6:
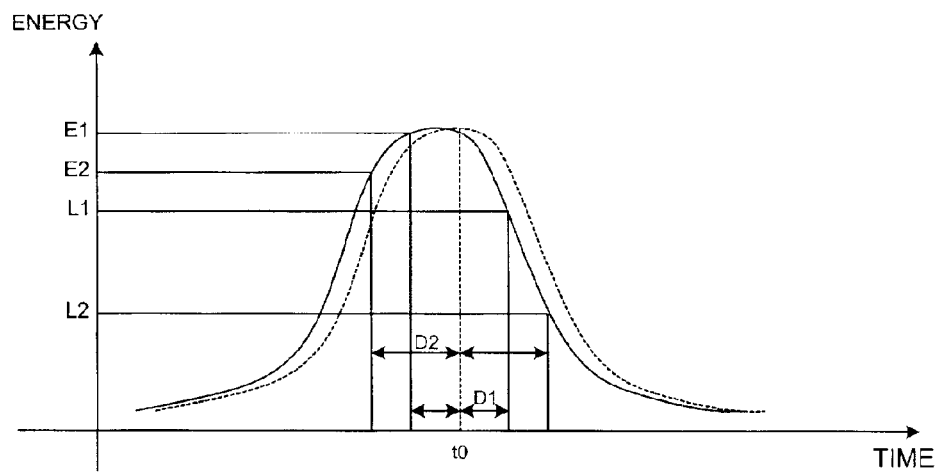
FIG. 6 is a diagram of the energy of the de-spread component.

FIG. 6 is a diagram of the actual energy of the de-spread component S1–S3. A curve in dashed line represents a presumed energy of the resolved component S1–S3. The diagram shows two possible calculation of values of the early and late signals E and L for different values D1 and D2 of the delay D. A first measurement using the delay D1 indicates a value E1 and a value L1 for the early and late de-spread signals E and L. The values E1 and L1 are obtained by measuring the energy of the de-spread component a period of time D1 before and after the presumed peak of energy at t0. A second measurement using a greater delay D2 indicates a value E2 and a value L2 for the early and late de-spread signals E and L. The values E2 and L2 are obtained by deriving the energy of the de-spread component a period of time D2 before and after the presumed occurrence of the peak of energy at t0.

It is to be noted that, with respect to the described method, receivers, apparatus and arrangements, modifications or improvements may be proposed without departing from the scope of the invention. For instance it is clear that this method may be implemented in several manners, such as by means of wired electronic circuits or, alternatively, by means of a set of instructions stored in a computer readable medium, said instructions replacing at least a part of said circuits and being executable under the control of a computer or a digital processor in order to carry out the same functions as fulfilled in said replaced circuits. The invention is thus not limited to the examples provided.

The word "comprising" does not exclude the presence of other elements or steps than those listed in a claim.

What is claimed is:

1. A method for tracking a resolved component of a multipath signal, the method comprising:

de-spreading the resolved component using a locally generated code sequence being advanced by a first variable delay, to obtain an early de-spread signal;

de-spreading the resolved component using the locally generated code sequence being retarded by a second variable delay, to obtain a late de-spread signal; and, deriving a correction signal from the early de-spread signal and the late de-spread signal to control the tracking wherein the first and second delays are randomly selected.

2. The method of claim 1, wherein the first and the second delays are substantially equal.

3. The method of claim 1, wherein the first and second delays are randomly selected from a plurality of predefined values.

* * * * *